United States Patent
Du et al.

(10) Patent No.: US 12,384,663 B2
(45) Date of Patent: Aug. 12, 2025

(54) HAPTIC FEEDBACK SYSTEM FOR ANTI-SWAY CONTROL OF A PAYLOAD

(71) Applicant: UNIVERSITY OF FLORIDA RESEARCH FOUNDATION, INCORPORATED, Gainesville, FL (US)

(72) Inventors: Jing Du, Gainesville, FL (US); Qi Zhu, Gainesville, FL (US); Tianyu Zhou, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 258 days.

(21) Appl. No.: 18/350,789

(22) Filed: Jul. 12, 2023

(65) Prior Publication Data

US 2024/0043246 A1 Feb. 8, 2024

Related U.S. Application Data

(60) Provisional application No. 63/370,174, filed on Aug. 2, 2022.

(51) Int. Cl.
*B66C 13/40* (2006.01)
*B66C 13/06* (2006.01)
*B66C 13/46* (2006.01)
*G06F 3/01* (2006.01)

(52) U.S. Cl.
CPC ............ *B66C 13/40* (2013.01); *B66C 13/063* (2013.01); *B66C 13/46* (2013.01); *G06F 3/016* (2013.01)

(58) Field of Classification Search
CPC ....... B66C 13/40; B66C 13/063; B66C 13/46; B66C 13/06–066; B66C 13/04–105; G06F 3/016
See application file for complete search history.

(56) References Cited

U.S. PATENT DOCUMENTS

| | | | | | |
|---|---|---|---|---|---|
| 4,544,070 | A | * | 10/1985 | Sickler | B66C 13/06 294/81.1 |
| 4,753,357 | A | * | 6/1988 | Miyoshi | B66C 19/002 700/218 |
| 5,117,992 | A | * | 6/1992 | Simkus, Jr. | B66C 13/48 901/4 |

(Continued)

OTHER PUBLICATIONS

Zhang, et al., CN110422764A, Nov. 8, 2019 (machine translation).*
Bube, DE102021121749A1, Feb. 23, 2023 (machine translation).*

*Primary Examiner* — Courtney D Heinle
(74) *Attorney, Agent, or Firm* — ALSTON & BIRD LLP

(57) ABSTRACT

A system, apparatus, and method are provided herein for haptic-based force balance for anti-sway control of a payload. A haptic feedback system for crane operation is provided including: a controller; a first haptic device including a first haptic device tip; a second haptic device including a second haptic device tip; and a structural member connecting the first haptic device and the second haptic device, where the controller is configured to correlate the first haptic device tip to a first reference point on a payload and to correlate the second haptic device tip to a second reference point on the payload, and where anti-sway control of the payload is effected by movement of the structural member by an operator.

20 Claims, 7 Drawing Sheets

(56) References Cited

U.S. PATENT DOCUMENTS

| | | | | |
|---|---|---|---|---|
| 5,127,533 | A * | 7/1992 | Virkkunen | B66C 13/063 212/329 |
| 7,367,464 | B1 * | 5/2008 | Agostini | B66C 13/063 212/308 |
| 7,970,521 | B2 * | 6/2011 | Sorensen | B66C 13/063 340/685 |
| 9,096,294 | B1 * | 8/2015 | Dong | B63B 27/32 |
| 9,120,650 | B2 * | 9/2015 | Langer | B66C 13/02 |
| 2008/0027611 | A1 * | 1/2008 | Recktenwald | B66C 13/063 701/50 |
| 2008/0103639 | A1 * | 5/2008 | Troy | G05D 1/005 701/2 |
| 2010/0250153 | A1 * | 9/2010 | Abel | B66C 23/905 702/41 |
| 2016/0096276 | A1 * | 4/2016 | Nahavandi | G09B 23/28 700/264 |
| 2018/0179027 | A1 * | 6/2018 | Bohnacker | B66C 13/20 |
| 2019/0084808 | A1 * | 3/2019 | Hartmann | B66C 15/045 |
| 2019/0177131 | A1 * | 6/2019 | Palberg | B66C 13/40 |
| 2019/0210854 | A1 * | 7/2019 | Eck | B66F 17/006 |
| 2019/0345007 | A1 * | 11/2019 | Niemelä | B66C 13/22 |
| 2020/0182310 | A1 * | 6/2020 | Rancourt | B64U 70/30 |
| 2021/0102642 | A1 * | 4/2021 | Lloyd | B66C 23/48 |
| 2021/0107774 | A1 * | 4/2021 | Bock | B66C 13/063 |
| 2021/0154833 | A1 * | 5/2021 | Peters | E04G 21/167 |
| 2022/0048742 | A1 * | 2/2022 | Kärki | G05D 1/0027 |
| 2022/0194749 | A1 * | 6/2022 | Englert | B66C 13/085 |
| 2022/0388816 | A1 * | 12/2022 | Hofmeister | G06F 3/017 |
| 2022/0411234 | A1 * | 12/2022 | Vihonen | B66C 13/063 |
| 2023/0061389 | A1 * | 3/2023 | Bartek | B66C 13/46 |
| 2023/0303364 | A1 * | 9/2023 | Sikora | B66C 13/40 |

* cited by examiner

HAPTIC FEEDBACK SYSTEM FOR ANTI-SWAY CONTROL OF A PAYLOAD

CROSS-REFERENCE TO RELATED APPLICATIONS

This application claims priority to U.S. Provisional Patent Application Ser. No. 63/370,174, filed on Aug. 2, 2022, the contents of which are hereby incorporated by reference in their entirety.

TECHNOLOGICAL FIELD

Embodiments of the present disclosure relate generally to remote control or teleoperation using haptic feedback, and more particularly, to haptic-based force balance for anti-sway control of a payload.

BACKGROUND

Teleoperation, remote control, or control-by-wire of devices can be challenging having unique constraints based on the type of device being controlled, and the controller afforded to the human operator. Devices such as robots have been developed for a variety of tasks where a human operator need not be present with the robot for operation, and often it may not be possible for a human operator to be present at the site of the controlled robot or device.

One such device that can employ teleoperation is a crane. Cranes of various types can have a human occupant/operator on-site with the crane, or have an operator located proximate or remotely from the crane that they are operating. Historically, static cranes such as those use for construction of tall buildings and used to transport shipping containers in a port use human operators located in a control room high above the ground where the operator has a bird's eye view of the crane envelope of operation. However, it is both time consuming and expensive for an operator to ascend to such control rooms. Thus, cranes are well-suited for teleoperation.

Cranes are considered one of the most valuable and indispensable assets among all types of construction machinery. Cranes are extensively used in construction projects to support critical activities such as heavy rigging and lifting. Static cranes are permanent or semi-permanent mechanical machines fixed to the ground or structural platforms, which can lift and move the payload along a predefined path. Mobile or dynamic cranes are typically a hoisting mechanical structure mounted on a truck or crawler and are not restricted to a fixed path like a static crane, and are capable of a pick-and-carry function. Crane operation is a high-skilled job that is accompanied by high risks. Controlling the locomotion and movements of the payload carried by a crane is non-trivial and challenging as the payload is sensitive to acceleration, deceleration, and swinging operations. Changing wind loads and other environmental factors contribute to the challenges of crane operation. These factors render crane operations more mentally demanding than other construction equipment such that human error can be a factor.

BRIEF SUMMARY

A system, apparatus, and method are provided herein for remote control or teleoperation using haptic feedback, and more particularly, to haptic-based force balance for anti-sway control of a payload. According to an example embodiment, a haptic feedback system for crane operation is provided including: a controller; a first haptic device including a first haptic device tip; a second haptic device including a second haptic device tip; and a structural member connecting the first haptic device and the second haptic device, where the controller is configured to correlate the first haptic device tip to a first reference point on a payload and to correlate the second haptic device tip to a second reference point on the payload, and where anti-sway control of the payload is effected by movement of the structural member by an operator.

According to an example embodiment, force feedback through the first haptic device and the second haptic device is generated based on movement of the payload. According to certain embodiments, force feedback through the first haptic device at the first haptic device tip is generated based on movement of the first reference point on the payload, and where force feedback through the second haptic device at the second haptic device tip is generated based on movement of the second reference point on the payload. The first reference point on the payload and the second reference point on the payload may be determined based on one or more of a size of the payload, a shape of the payload, or a weight distribution of the payload. The first reference point on the payload and the second reference point on the payload are, in some embodiments, determined from a database of payload profiles, where the payload is correlated to a substantially similar reference payload of a payload profile. Movement of the structural member by the operator, in some embodiments, causes movement of the payload by the crane corresponding to the movement of the structural member. Movement of the payload by the crane includes, in some embodiments, movement of one or more of a trolley of the crane, a jib of the crane, or a pulley system of the crane.

Embodiments provided herein include a method for haptic feedback for crane operation including: receiving an indication of a first reference point on a payload; receiving an indication of a second reference point of the payload; causing movement of the payload at the first reference point based on input from a first haptic device; causing movement of the payload at the second reference point based on input from a second haptic device; providing haptic feedback to the first haptic device based on movement of the payload at the first reference point; and providing haptic feedback to the second haptic device based on movement of the payload at the second reference point. The first haptic device of an example embodiment is connected to the second haptic device by a structural member.

According to some embodiments, haptic feedback provided to the first haptic device based on movement of the payload at the first reference point includes movement of a first tip of the first haptic device based on movement of the payload at the first reference point and where haptic feedback provided to the second haptic device based on movement of the payload at the second reference point includes movement of a second tip of the second haptic device based on movement of the payload at the second reference point. According to certain embodiments, the indication of the first reference point of the payload is based on user input identifying the first reference point on the payload, and the indication of the second reference point of the payload is based on user input identifying the second reference point on the payload.

According to certain embodiments, the indication of the first reference point of the payload is based on a first stored reference point of a reference payload in a database of payload profiles, and the indication of the second reference point of the payload is based on a second stored reference point of the reference payload in the database of payload profiles. The method of some embodiments further includes selecting the reference payload based on at least a predefined similarity to the payload. The predefined similarity includes, in some embodiments, one or more of a payload size, a payload shape, or a payload weight distribution.

Embodiments provided herein include a controller for haptic feedback for crane operation, the controller configured to: receive an indication of a first reference point on a payload; receive an indication of a second reference point of the payload; cause movement of the payload at the first reference point based on input from a first haptic device; cause movement of the payload at the second reference point based on input from a second haptic device; provide haptic feedback to the first haptic device based on movement of the payload at the first reference point; and provide haptic feedback to the second haptic device based on movement of the payload at the second reference point. The first haptic device of an example embodiment is connected to the second haptic device by a structural member.

According to some embodiments, haptic feedback provided to the first haptic device based on movement of the payload at the first reference point includes movement of a first tip of the first haptic device based on movement of the payload at the first reference point and where haptic feedback provided to the second haptic device based on movement of the payload at the second reference point includes movement of a second tip of the second haptic device based on movement of the payload at the second reference point. According to certain embodiments, the indication of the first reference point of the payload is based on user input identifying the first reference point on the payload, and the indication of the second reference point of the payload is based on user input identifying the second reference point on the payload.

According to certain embodiments, the indication of the first reference point of the payload is based on a first stored reference point of a reference payload in a database of payload profiles, and the indication of the second reference point of the payload is based on a second stored reference point of the reference payload in the database of payload profiles. The controller of some embodiments is further configured to select the reference payload based on at least a predefined similarity to the payload. The predefined similarity includes, in some embodiments, one or more of a payload size, a payload shape, or a payload weight distribution.

The features, functions, and advantages that have been discussed can be achieved independently in various embodiments or may be combined in yet other embodiments; further details of which can be seen with reference to the following description and drawings.

BRIEF DESCRIPTION OF DRAWINGS

Figure 1:
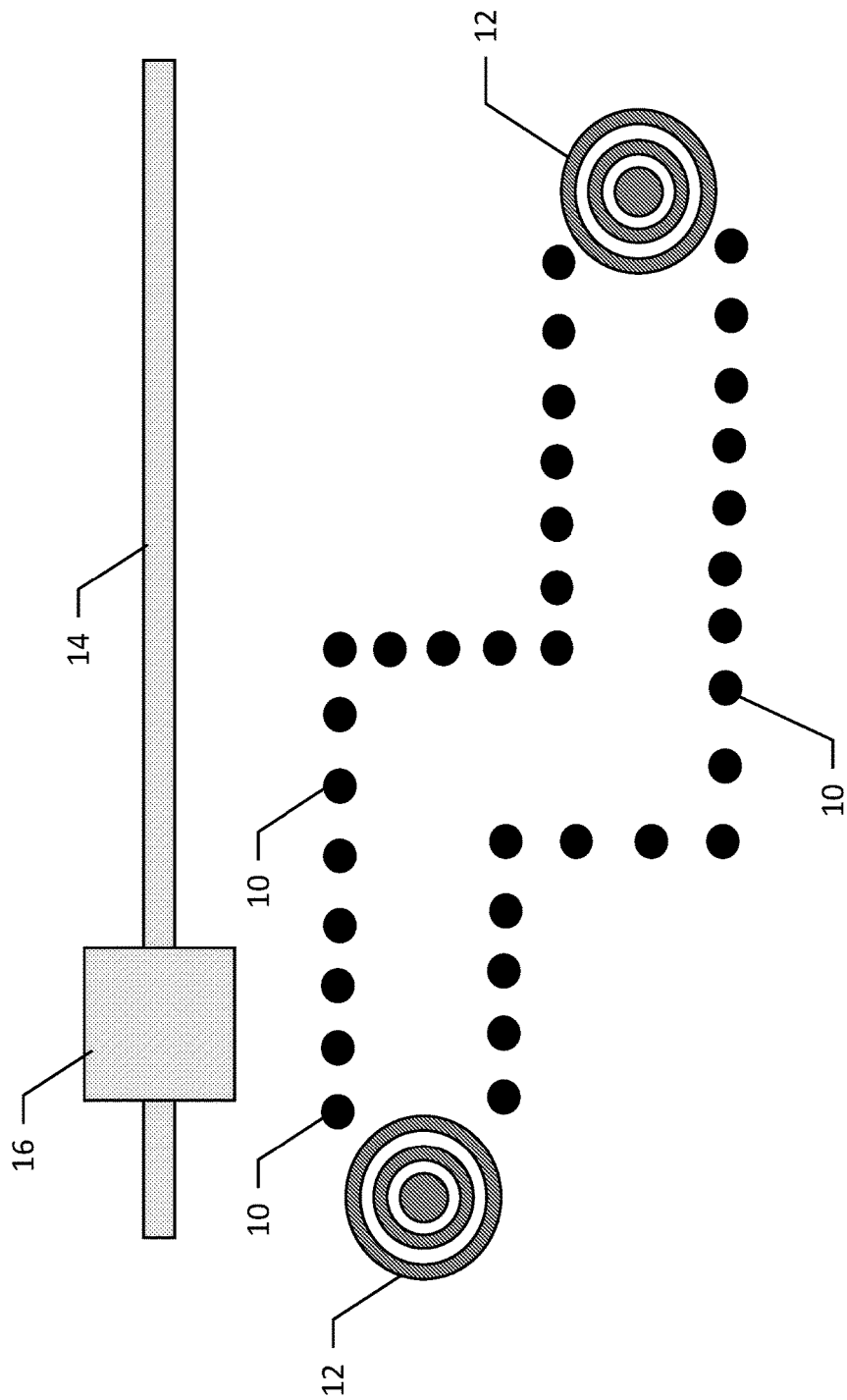
Figure 2:
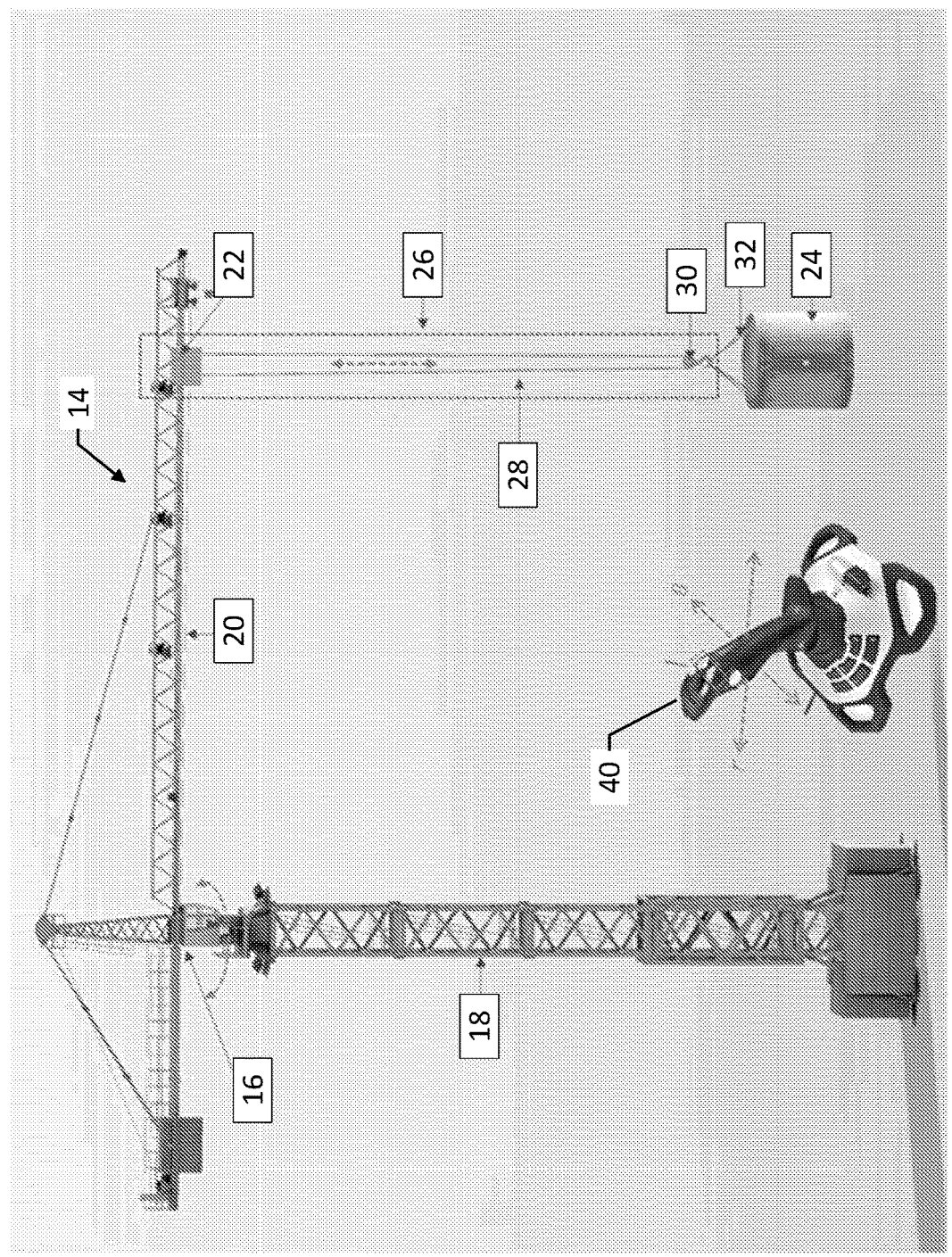
Figure 3:
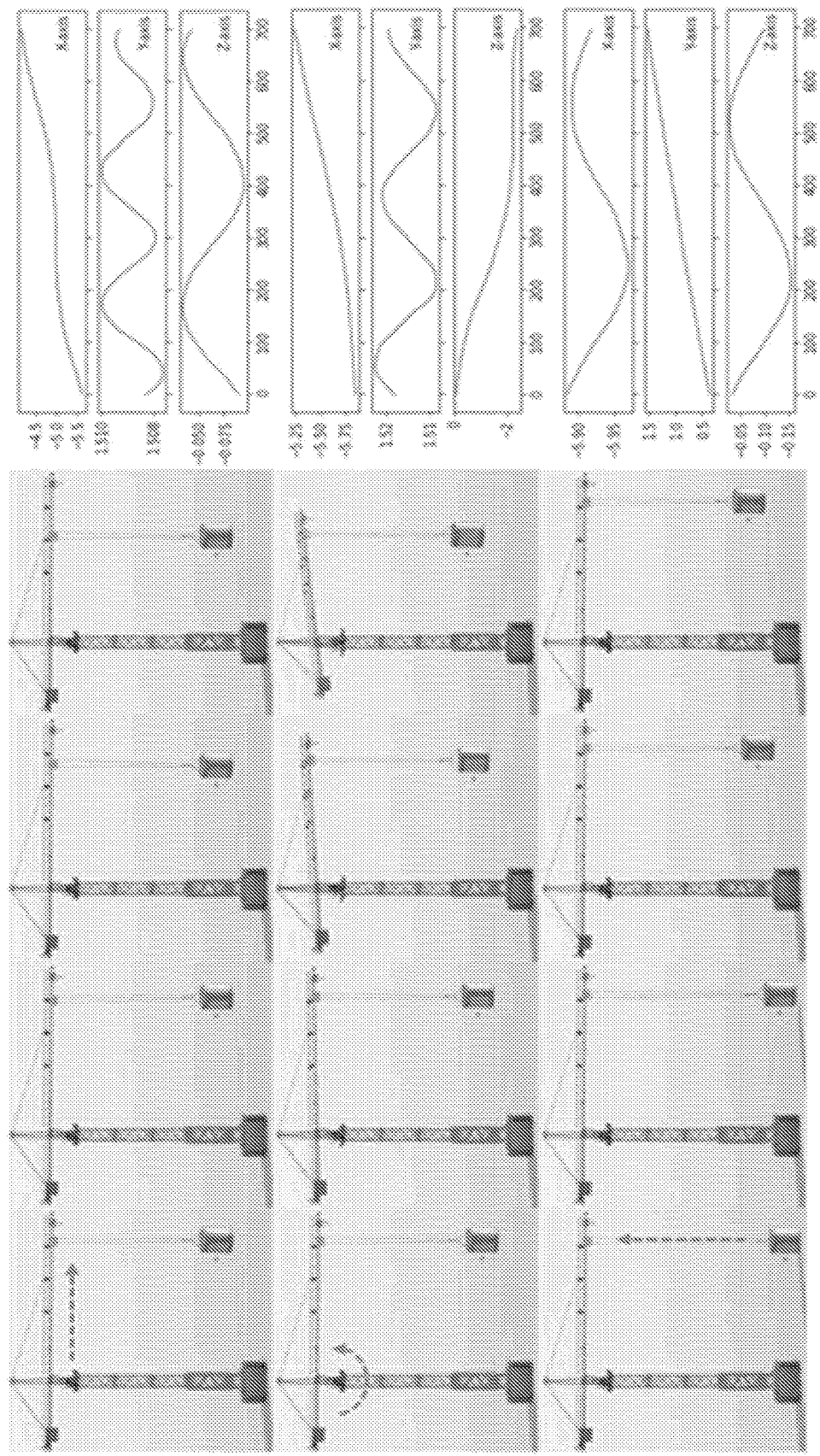
Figure 4:
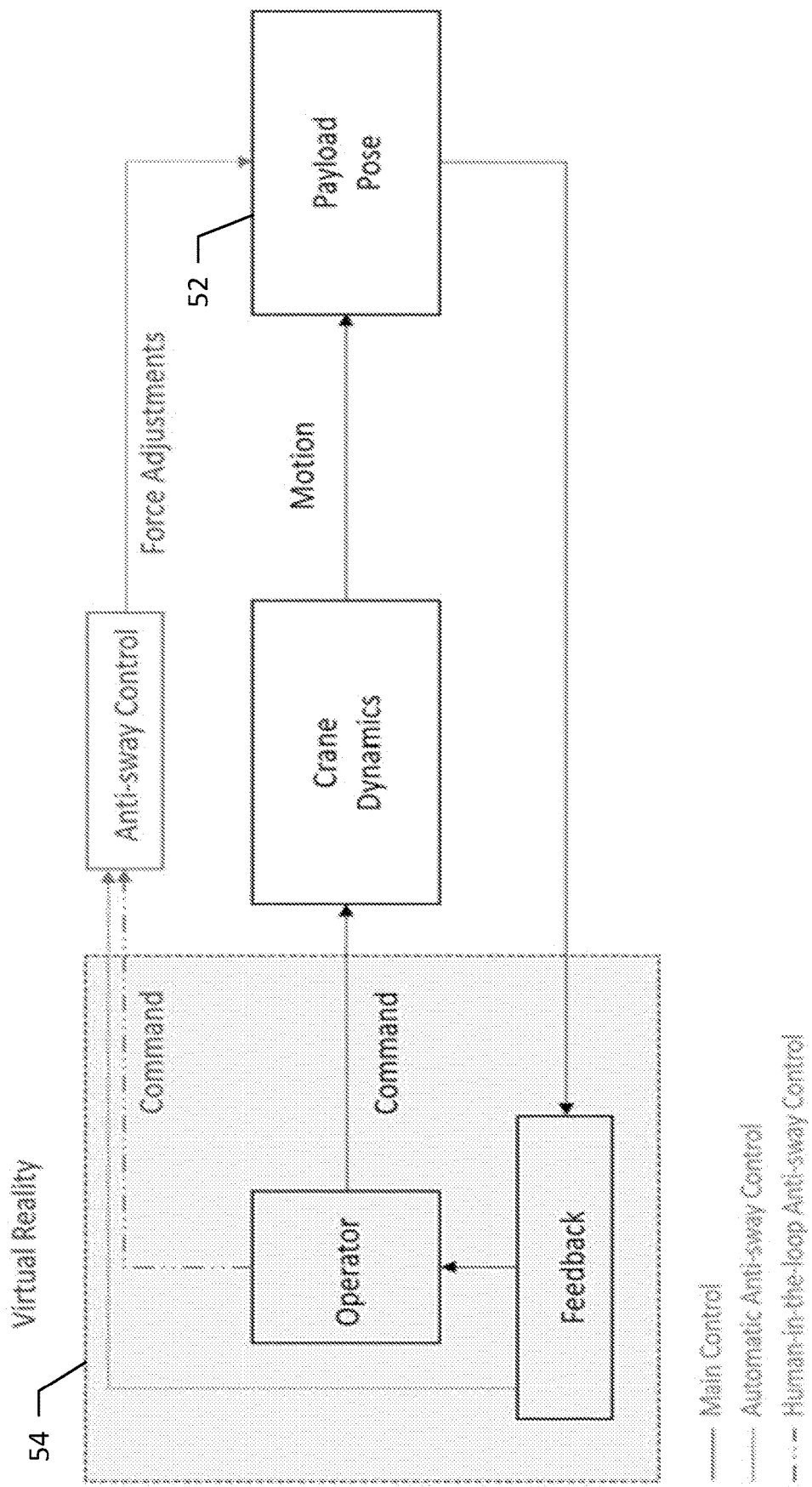
Figure 5:
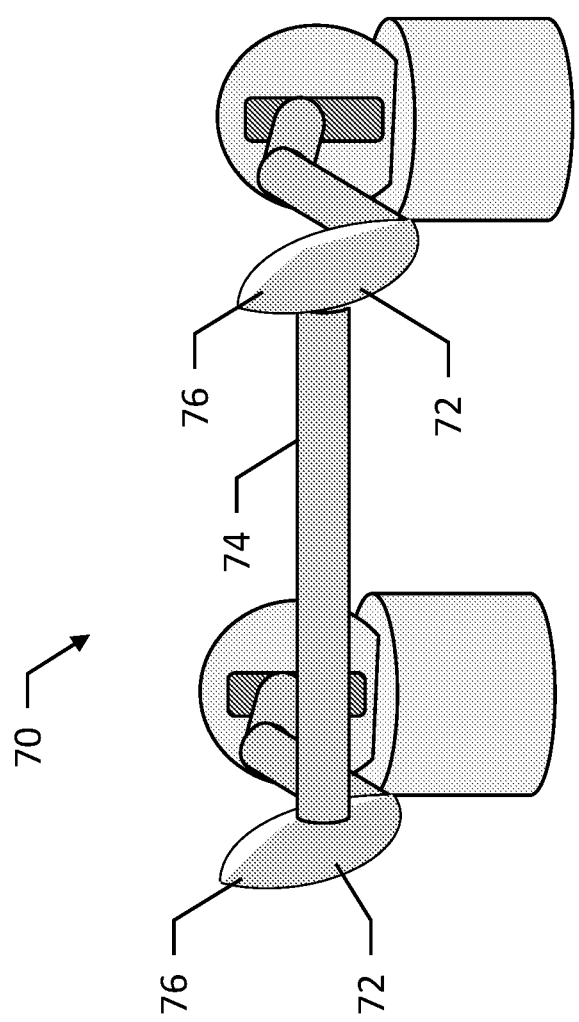
Figure 6:
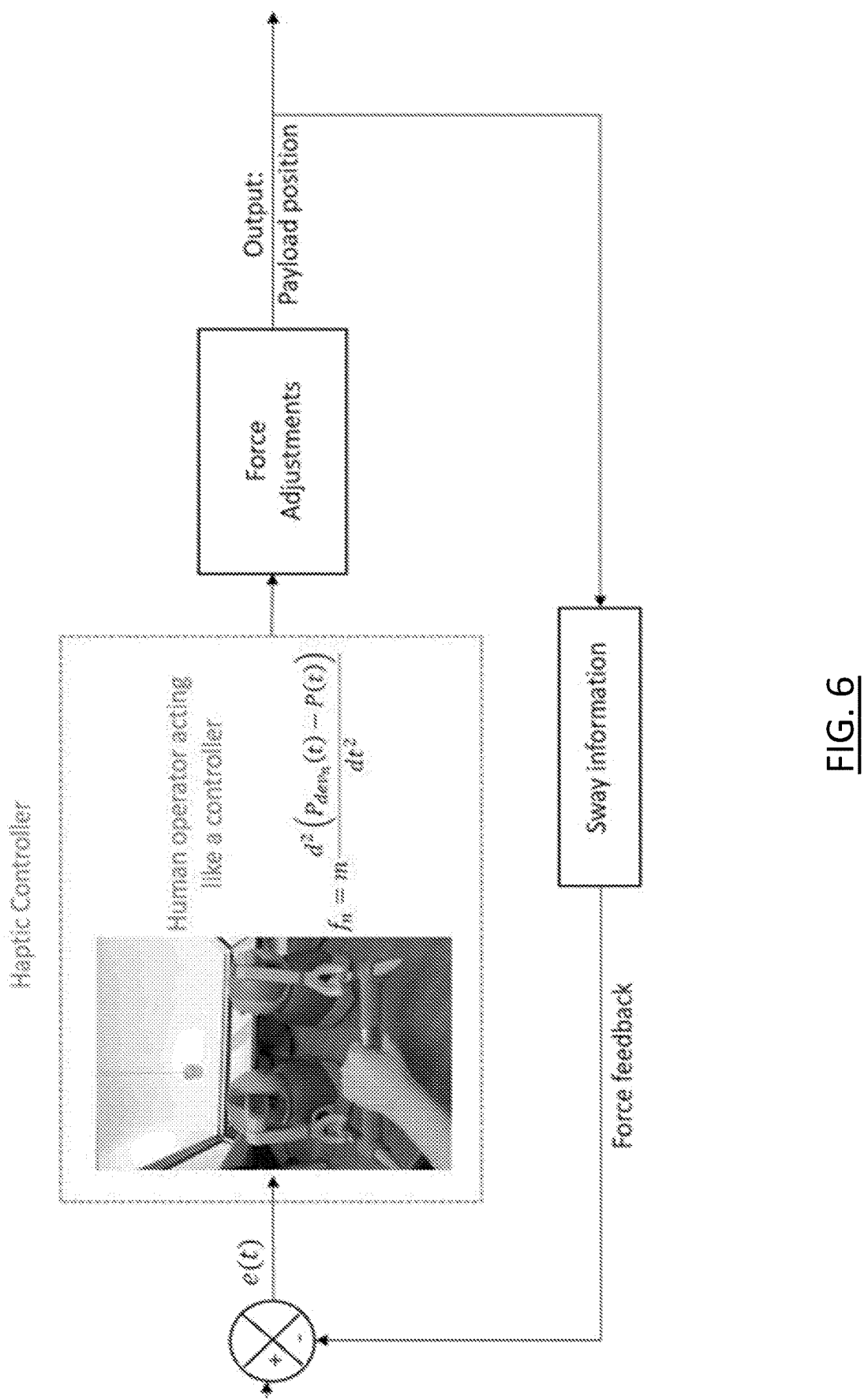
Figure 7:
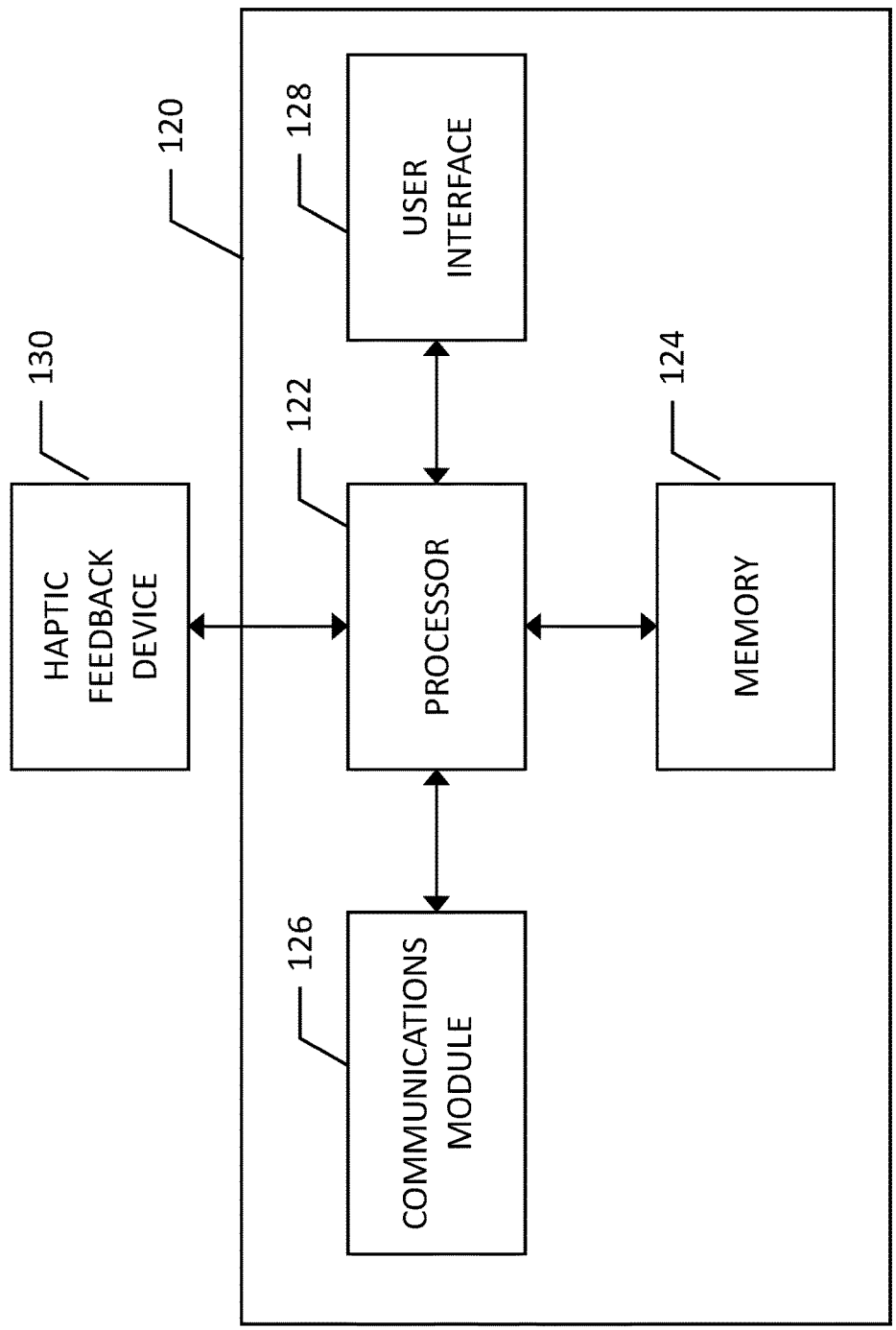

Having thus described certain embodiments of the present disclosure in general terms, reference will now be made to the accompanying drawings, which are not necessarily drawn to scale, and wherein:

FIG. 1 illustrates a diagram of zig zag exam field between two target locations for a crane according to an example embodiment of the present disclosure;

FIG. 2 illustrates a diagram of a crane and components thereof according to an example embodiment of the present disclosure;

FIG. 3 illustrates how load position changes during swings, hoists, and trolley travel according to an example embodiment of the present disclosure;

FIG. 4 illustrates the overall architecture of closed loop control for anti-sway according to an example embodiment of the present disclosure;

FIG. 5 illustrates a haptic force feedback device according to an example embodiment of the present disclosure;

FIG. 6 is a diagram of force feedback control for an anti-sway system according to an example embodiment of the present disclosure; and FIG. 7 is a schematic diagram of an example of a controller that may be used to control a crane remotely as described herein according to an example embodiment of the present disclosure.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Operation of cranes is a challenging task that requires a skilled operator to manage the various factors that impact the movement and precision operation required by cranes. Cranes are often used in operational envelopes that are limited, such as during the construction of a tall building in an urban environment, where operational challenges further include other buildings, pedestrian safety, and building worker safety. Given the difficult nature of crane operation, employing teleoperation or control-by-wire can provide benefits to an operator that supplement a crane operator's skillset to improve safety and precision of crane operation. A particular aspect of crane operation that is difficult to master is the control of payload sway where excessive movement of the payload due to the locomotion of cranes, over-corrective actions, and environmental disturbances can significantly affect the safety and efficiency of crane operations, particularly in tower crane operations. Embodiments described herein provide a force-feedback based control method for anti-sway control. The system of an example embodiment employs two haptic feedback devices provided as joysticks connected by a pole or cross-member to provide feedback and balance status of a payload. The sway error can be represented by the position and rotation changes of the pole or cross-member. The operator can use this haptic controller to adjust the payload pose by applying the counterbalance force to the pole through the two haptic feedback devices.

Embodiments of the present disclosure provide a human-centric approach to anti-sway control of payloads that enables more natural sensorimotor coordination from the operator in complex crane operations. The two haptic controllers or devices provided herein are connected with a connecting member forming a "seesaw" type of weight balance simulator. The payload sway status is mirrored synchronously as the loss of balance of the weight balance simulator. By holding the haptic controls joined by the connecting member, a human operator can feel the large-scale payload sway as a weight balancing sensation in the hand. Then the control of the tower crane payload can rely on the operator's natural ability to maintain balance to suppress the sway. As such, the human operator can react to the control tasks with a more integrated sensorimotor process.

Payload sway is the excessive oscillating movement of the payload due to the fast locomotion of cranes, overcorrective actions of the operator, and environmental disturbances such as winds. Once beyond a certain threshold, the payload sway can significantly affect the productivity of crane operations and pose a non-negligible hazardous safety factor on both the workplace, the human operator, and people in proximity of the workspace. Embodiments disclosed herein provide a user-friendly and intuitive method of sway suppression. These methods leverage reference models of the system states, such as the structure and kinematic features of the crane, to estimate the oscillating movement of the payload, and then apply a counteracting signal to suppress undesired movements.

The anti-sway control problem is generally solved using the optimal control theory, where the desired trajectory of a payload is maintained by minimizing the assumed function corresponding to the sway angle and its time derivatives or to the energy consumption. Conventional methods for solving the optimal control problem are employed to dampen the sway. Solving an optimal control problem relies on the formulation models of the system states or how the deviation from the desired states is quantified. Depending upon the timing of the suppression, automatic anti-sway methods can be categorized into feedback (reactive) and feedforward (anticipatory) suppressions. The feedback suppression continuously collects the system's state and reduces the effect of the unsolicited oscillation by adding a regulatory input to smooth the trajectory. The feedforward control predicts the oscillating movement based on a reference model and alters the command input signals proactively.

Despite the theoretical and practical advances on automatic anti-sway suppression, critical challenges still exist. Most existing works model the payload sway as a single pendulum problem where the payload is assumed to anchor to a single pivot point for periodical movement. In real-life applications, a tower crane often exhibits double-pendulum effects such as from trolly to hook and from hook to payload, where the payload movement may demonstrate a more nonlinear behavior. Anti-sway methods rooted from the optimal control theory do not adequately convert the nonlinearity into the original linear solutions. Most existing automatic anti-sway suppression methods are based on an open-loop approach, where standard reference models of system states (e.g., structure of the crane) are used to dampen the sway by controlling the acceleration and deceleration of the bridge and/or trolly motions through the crane's adjustable frequency drive motion controllers. In contrast, real-life tower crane sway is better represented as a closed-loop problem, where severe external disturbances, parametric uncertainties, and unmodeled uncertainties may not be captured by the reference models. The closed-loop approach relies on a precise and accurate measure of the payload system states such as the sway angles and human operator's intended commands.

Closed-loop approaches for anti-sway suppression of double-pendulum cranes rely on real-time sensor data. For feedforward controls, an accurate prediction of the human operator's next action is critical, which is typically challenging. A fully automated approach for suppressing sway breaks the integrity of the sensorimotor process of human operators, in which sensory information is coupled with a corresponding motor response in complex motor tasks. Such a human-out-of-the-loop approach may impair the situational awareness in crane operations. As such, embodiments described herein employ a human-in-the-loop approach for anti-sway control.

In complex motor tasks, humans rely on multimodal sensorimotor processes, such as the visual, auditory, and somatosensory (tactile and proprioceptive) stimuli to make sense of the consequence of the initiated action. When the perceptual ability is affected, such as initiating action without perceiving the immediate outcomes in a timely manner, the motor planning and feedback loop is broken. Causing a perceptual-motor mismatch such as the inability to effectively integrate perceptual information with the execution of voluntary behaviors. The perceptual-motor mismatch is present when the perceptual ability is affected by external systems, such as caused by time delays in equipment operations and human-automation interaction where human responsibilities are partially or completely replaced by an automated system.

When automatic, human-out-of-the-loop anti-sway systems are used, a perceptual-motor mismatch may be induced. This is because the outcomes from an initiated motion command by the human operator are continuously altered by an external automation system. As a result, the human operator may have to adopt a "move and wait" strategy as often seen in remote operations when delays are present. Human operators primarily rely on visual channels to coordinate the motor actions in crane operations employing visuomotor coordination.

Embodiments provided herein employ haptic feedback to benefit from haptic motor coordination of humans in motor tasks. Embodiments provide an effective solution for force feedback simulation to transfer the physical interaction information to the human operator capitalizing on haptic motor coordination. Haptic motor coordination can provide a more accurate perception about the size and position of an object, as well as triggering automatic and efficient handling corrections if a sudden perturbation causes a change.

Embodiments of the present disclosure include a haptics-based force balance method for anti-sway control. Further, embodiments enable training of such a system using a physics engine employed in a Virtual Reality (VR) system that includes tower crane modeling, physics simulation, haptic device programming, and data collection. Such a VR-based real-time simulator can be used for a payload positioning task with the crane model, an operation room located in the cabin, and a zig zag exam field. The zig zag exam field of an example embodiment includes thirty-five poles 10 and two fixed target circles 12 as shown in FIG. 1. Also illustrated is the crane 14 with control room 16. The poles include physical properties that can be shown to be knocked over when a collision occurs, with force feedback provided to an operator through haptic controls. In the VR simulator used for training, the operator can see the movement of the payload through a first person view from the control room 16, or change viewpoints as needed to understand the environment.

Embodiments of an anti-sway control system include a precise model of crane dynamics. A double-pendulum tower crane system with three degrees of freedom (DoF) is illustrated in FIG. 2 including the control room 16 and crane 14. The crane includes a vertical column or tower 18, a jib 20, a trolley 22 and a payload 24. Connecting the payload 24 to the trolley 22 is a pully system 26 of suspension cables 28 with a hook 30 disposed at the end attached to rigging cables 32 connected to the payload. A hinge joint allows rotation around a specified axis of the jib 20 relative to the tower 18. A motorized prismatic joint enables translation along one axis controls translation of the trolley 22 along the jib 20. To change the direction of the force needed to lift the payload and redistribute that fore over a distance, the pulley system 26 is used with suspension cables 28 and a winch that is able to pull in and feed out the suspension cables. This system considers the double pendulum effects in the simulation. The payload is linked to the hook 30 through four rigging cables 32 that leave the payload 24 with three degrees of freedom in rotation.

With the model constructed, the control system of example embodiments was developed to allow the human operator to operate the crane of the model in a VR environment. The main controller enables a human operator to perform a series of movements including swings (spinning the crane), trolley travels (moving the load along the jib), and hoists (raising the load). All of the operation all commands of an example embodiment were integrated into a single joystick 40. Two buttons on the joystick can control the hoist (e.g., left for up, right for down), the horizontal values of the joystick can control the slewing motion (rotation) while the vertical values of the joystick control trolley travel. With basic training, an operator with minimal or no previous crane operation experience can use the aforementioned joystick control to position a load anywhere within the crane's operational envelope. FIG. 3 illustrates how load position changes during swings, hoists, and trolley travel. The position changes in rows of images on the left side of FIG. 3 correspond to movement along the x-axis, y-axis, and z-axis shown in the corresponding row on the right side of the figure.

The sway of the payload affects operability and increases the risks during crane operation. Embodiments of the present disclosure provide anti-sway control functions to suppress the sway effects. Embodiments employ a closed-loop control method as a solution otherwise referred to as a feedback control system that leverages the measurement and estimation of system states to achieve and maintain a desired output condition. The anti-sway control system proposed herein continuously monitors sway error signals (the difference between the actual payload state and the reference state) and to make the necessary corrections to reduce the sway effects. The closed-loop control system is used as a control scheme for reducing payload sway as it is less sensitive to a variety of parameters and thus more robust to various scenarios. The advancement of sensing and simulation technologies facilitates the precise measurement of dynamic system states used for the closed-loop control. The closed-loop control can incorporate uncertain human behaviors, such as actions of the human operator, as part of the control loop.

FIG. 4 illustrates the overall architecture of the closed loop control methods provided herein. As shown, the precise kinematic states are collected from the payload shown as payload pose 52, such as the position and angular speeds. The collected data is sent to a controller 54, realized by an automatic process or by a human-in-the-loop process, to minimize the deviation between the real-time kinematic states and the desired states. The desired states refer to a smooth trajectory of the payload movement without sway errors. To simulate realistic work scenarios for training in a VR environment, human operator commands to the overall crane movement can be modeled. This adds additional complexity to the problem such that the physics engine in Unity 3D can be used to simulate the complex interactions between the payload and other components of the crane, including the jib and the tower.

Embodiments provided herein are improvements over fully automatic sway control systems based on a proportional integral derivative (PID) controller and a reverse plugging system with manually applied reverse torque to brake in advance via a push button pendant. The haptics based force balance controller described herein employs a novel closed-loop control method that features a human-in-the-loop process. The proposed anti-sway control system includes a haptic controller 70 shown in FIG. 5 in which the tips of two haptic devices 72 are connected by a structural member 74, such as a three-dimensional (3D) printed pole and uses the connected haptic devices to provide the balance status of the payload. FIG. 6 illustrates such an embodiment where the sway error is represented by the position and rotational changes of the pole. The operator uses the haptic controller to adjust he payload pose by applying the counterbalance force to the structural member via the attached haptic devices.

To accurately restore the payload sway through the connected haptic device a haptic controller is used that can provide 3-DOF force feedback. The structural member 74 simulates the positional changes of the payload by the haptic devices 72 representing reference points of the payload. The structural member simulates the position of a line connecting these two reference points which cross the centroid of the load. The relative position changes of the reference points to the crane are used to drive the position changes of each tip 76 of the respective haptic devices 72 by force. To obtain the position reflections of the tips of the haptic devices in real world coordinates, calibration is performed to ensure a maximum range of the tips relative to the reference points.

Reference points on the payload in the VR space can be digitally tracked through the position of the virtual payload. However, when the device of example embodiments is employed for controlling an actual crane and movement of the payload, the reference points may be selected based on the payload size, shape, and weight distribution. These reference points may be selected via a user interface or retrieved from a database of payload profiles, where reference points are preselected based on a reference payload profile. The reference points on a real payload can be tracked through vision techniques, such as through stereoscopic image processing that tracks points in space. These real payload reference points can be used in the same manner as the virtual payload reference points, with the same outcome. Hence, the VR training techniques described herein mimic control of a real payload substantially identically, and the training is an effective tool for real-world simulation of payload movement and sway control.

After calibration, the position values of the tips 76 in the virtual world coordinate are obtained, which are initially the same as the position values of the reference points of the payload. The feedback driving position changes of each tip 76 can then be implemented by the following equation:

$$F_n = m \frac{d^2(P_n(t) - P_{ref_n}(t))}{dt^2} \qquad \text{Eq. (1)}$$

where n indicates the coordinate axis's, $n \in \{x,y,z\}$, m is the magnitude parameter to control the force level, $P_n(t)$ is the current load position in the n-axis, and $P_{ref_n}(t)$ is the designed load position in the n-axis. Hence, $(P_n(t)-P_{ref_n}(t))$ refers to the sway error in the n-axis, and $F_n$ is the force applied to the haptic device 72 tip 76. According to this transformation, the sway errors in terms of position offsets can be transferred into force feedback delivered to the human operator through the haptic controller. To obtain real-time sway errors, the offset distance in each axis is monitored and updated between the desired position and the current position. An inverse transform function is applied to transform the position from world space to local space, relative to the crane, as follows:

$$_P^W T = \begin{bmatrix} _P^W R & ^W P_{B_0} \\ 0 & 0 & 0 & 1 \end{bmatrix}$$  Eq (2)

$$_C^W T = \begin{bmatrix} _C^W R & ^W P_{C_0} \\ 0 & 0 & 0 & 1 \end{bmatrix}$$

$$_P^C T = _C^W T^{-1} {_P^W T} = \begin{bmatrix} _P^C R_{11} & _P^C R_{12} & _P^C R_{13} & ^C P_{P,x} \\ _P^C R_{21} & _P^C R_{22} & _P^C R_{23} & ^C P_{P,y} \\ _P^C R_{31} & _P^C R_{32} & _P^C R_{33} & ^C P_{P,z} \\ 0 & 0 & 0 & 1 \end{bmatrix}$$

where P indicates the position, R indicates the orientation $_P^W T$ is the location matrix of the origin of the payload coordinate system measured in the world coordinate system, $_C^W T$ is the location matrix of the origin of the crane coordinate system measured in the world coordinate system, and finally, $_P^C T$ is the location matrix of the origin of the payload coordinate system measured in the crane coordinate system. By this transformation, the sway errors are only counted by the local position offsets relative to the crane, ignoring its world space movements.

Once the operator sensed the sway error by the force feedback, they can then use the controller to counterbalance the sway effects. This countered force input is calculated according to the following equation:

$$f_n = m \frac{d^2(P_{tip_n}(t) - P_n(t))}{dt^2}$$  Eq. (3)

where n indicates the coordinate axis's, $n \in \{x,y,z\}$, m is the magnitude parameter to control the force level, $P_{tip_n}(t)$ is the tip position in virtual coordinate axis n, $P_n(t)$ is the current load position in the n-axis, and $f_n$ is the countered force output applied in the n-axis. Overall, this system enables the operator to sense force changes caused by the movements of the tips 76 of the haptic devices 72, the load sway, and the rotation estimation. Further, it enables the operator to perform the anti-sway operation by applying an additional force to the payload through the haptic controller.

Employing systems as described herein to provide a human-centric approach to anti-sway control of payloads that enables more natural sensorimotor coordination from the operator in complex crane operations. Referring to the operation of the crane 14 through a zig zag test as depicted in FIG. 2, the operation can train an operator to precisely control a load and to avoid sway through intuitive haptic feedback. The zig zag corridor test requires the crane operator to carefully move a load within a limited range. The comparison between the payload trajectory during the task and the centerline of the zig zag indicates the operational offset errors. To access this offset error, embodiments may employ Symmetrized Segment-Path Distance to compare both the shape and physical distance between the two trajectories as a whole, regardless of their time indexing or the number of location data points that compose them. The trajectory accuracy of an operator can be measured and quantified as follows:

$$D_{SPD}(T^e, T^b) = \frac{1}{n_e} \sum_{i_e=1}^{n_e} D_{pt}(P_{i_e}^1, T^b)$$  Eq. (5)

$$D_{SSPD}(T^e, T^b) = \frac{D_{SPD}(T^e, T^b) + D_{SPD}(T^b, T^e)}{2}$$  Eq. (6)

where $T^e$ is the trajectory recorded in the training exercise from the four conditions and $T^b$ is the standard route (e.g., the centerline of the zig zag). Where $D_{pt}(P_{i_e}^1, T^b)$ is the minimum distance from point p of $T^e$ to the trajectory $T^b$, which is measured by Hausdorff distance in an example embodiment. $D_{SSPD}(T^e, T^b)$ is symmetric segment-path distance that takes the average value of the distances from both $T^e$ to $T^b$ and $T^b$ to $T^e$. $D_{SSPD}$ can be calculated for each trajectory record from the four conditions to the standard route and then used as the metric of trajectory accuracy. The lower $D_{SSPD}$ value means fewer offset errors.

To quantify and understand the placement accuracy of a payload, the location of the payload is recorded when it reaches the target point. The Euclidean distance between the payload location and the center of the target point can be calculated as follows:

$$d(p^l, p^r) = \sqrt{(p_x^l - p_x^r)^2 + (p_y^l - p_y^r)^2}$$  Eq. (7)

where $p^l$ is the recorded position of payload from each trail and $p^r$ is the central position of the target point. A larger $d(p^l, p^r)$ value indicates a larger positioning error. Then $d(p^l, p^r)$ is used as the placing accuracy value.

The haptics-based anti-sway control system described herein improves a human operator's ability for anti-sway control and ultimately the crane operation. Embodiments improve accuracy and efficiency. Embodiments provide an enhanced sensorimotor process via the haptic controls as embodiments provide operators an additional channel for sensing the kinematic states of the payload, as well as the dynamics of the mass center. Operator perceived information is closely coupled with the actions taken. Further, the haptic system described herein serves as a controller for rebalancing the payload. In such a way, the feedback and control commanding processes are fully integrated.

The crane of example embodiments may employ a mechanical damper, where there is a connection between the mechanical damper and the handheld haptic controller and the sensor system or the payload sway control system described herein. The mechanical damper of an example embodiment employs a set of actuators, such as electric motors, hydraulic cylinders, or a combination thereof to apply counterbalancing forces generated by the haptic devices to the payload. These actuators can be connected to the trolley of the crane and payload via a network of cables and pulleys, allowing for precise control of the payload's position and orientation.

Example embodiments can employ brushless electric direct current motors used as actuators in the sway control system due to their high torque-to-weight ratio, precision control, and low maintenance requirements. These motors can be coupled with high-resolution encoders to ensure accurate position control. To convert the motor's rotational motion into linear motion for sway control, a ball screw or lead screw mechanism can be employed. The choice between such mechanisms can depend on factors such as load capacity, efficiency, cost, and desired response time.

Hydraulic cylinders can be an alternative to or work in concert with electric motors, offering high force output and precise control for heavy loads. They hydraulic cylinders can be connected to a hydraulic power unit, which supplies pressurized fluid to extend or retract the cylinders. The position control of hydraulic cylinders can be achieved using proportional or servo valves that modulate the fluid flow based on the control signals from the sway control system.

Another optional mechanism for transmitting the counterbalancing forces from the actuators to the payload includes an articulated arm. The articulated arm of an example embodiment is composed of several rigid segments connected by joints, allowing for a wide range of motion. Embodiments of the articulated arm provides increased flexibility in controlling the payload's position and orientation, as the arm can adapt to complex motion paths. The use of an articulated arm, however, may require more sophisticated control algorithms to ensure stability and precision.

According to some embodiments, a cable system is used to transmit the counterbalancing forces from the actuators to the payload. The system includes of an example embodiment includes a series of pulleys mounted on the crane's trolley and the payload. This arrangement enables the transmission of forces in multiple directions, allowing for precise control of the payload's position and orientation. The cable-pulley system also provides mechanical advantage, making it easier to handle heavy payloads with minimal actuator force. The cable-pulley system includes cables, pulleys, and attachment points on the crane's trolley and the payload.

The cables employed by an example embodiment include high-strength steel cables used to transmit the counterbalancing forces from the actuators to the payload. These cables are designed to withstand the forces exerted by the say control system without significant elongation or deformation. The pulleys of example embodiments are mounted on the crane's trolley and on the payload. The pulleys are generally designed to change the direction of the cable forces, allowing for precise control of the payload's position and orientation. The pulleys can be single or multi-groove, depending on the complexity of the system and the desired level of force distribution. The cables of example embodiments are securely fastened to the actuators and the payload at designated attachment points. These attachment points can be adjustable to accommodate different payloads and crane configurations.

Referring back to FIG. 2, the crane 14 has a trolley 22 with a set of pulleys that can be attached, for example, at the corners of the trolley. The payload also has a set of pulleys, which may be attached at the corners of the payload. The actuators of an example embodiment are mounted on the trolley 22 of the crane 14, with their output shafts connected to the cables 32. The cables 32 are threaded through the pulleys on the trolley 22, then through the pulleys on the payload, and finally back to the trolley creating a closed-loop system. When the actuators apply force to the cables, the tension in the cables is adjusted, causing the payload to move in the desired direction, effectively counteracting any sway.

A parallel linkage mechanism may be employed to maintain a constant orientation of the payload throughout the sway control process. This mechanism includes multiple linkages connected in parallel between the crane's trolley and the payload. The linkages work together to transmit the counterbalancing forces while keeping the payload's orientation constant. This design is particularly beneficial for applications where maintaining the payload's orientation is critical, such as in the construction of high-rise buildings or the handling of fragile materials The rigid links of an example embodiment are structural components of the parallel linkage mechanism. The rigid linkages of an example embodiment are designed to withstand the forces exerted by the sway control system without significant deformation. The linkages can be made from lightweight and rigid materials, such as aluminum, magnesium, carbon fiber, composites, etc.

The linkages of an example embodiment are connected to the crane's trolley and the payload via joints, allowing for relative motion between the trolley and the payload. These joints can be simple hinge joints or more sophisticated ball-and-socket joints, depending upon the desired range of motion and payload orientation requirements. The crane's trolley and the payload of an example embodiment are connected by a set of rigid linkages arranged in parallel. The linkages are connected to the trolley and payload at designated attachment points using joints. When the actuators apply force to the payload, the linkages work together to transmit the counterbalancing forces while maintaining a constant payload orientation. As the trolley moves, the joints on the linkages allow for relative motion between the trolley and the payload, preventing unwanted rotations or displacements in the payload's orientation. This design ensures the payload maintains a consistent orientation throughout the sway control process. Both the cable-pulley system and the parallel linkage mechanism are integral to the sway control system of an example embodiment, providing the necessary mechanical structure to transmit the counterbalancing forces from the actuators to the payload and maintain it stability during tower crane operations.

The handheld force control system of example embodiments described herein includes haptic devices that provide force feedback to a human operator. The mechanical damper, which controls the position and orientation of the payload, needs to be in communication with the handheld force control system to ensure proper operation. This communication can be achieved through a combination of hardware and software components.

Hardware employed in example embodiments described herein can include actuator drivers, data transmission, and a microcontroller or processor, among various other components. The actuators, whether electric motors or hydraulic cylinders, require drivers to regulate their operation based on the control signals received from the handheld force control system. For electric motors, motor drivers or motor controllers are used to convert the control signals into appropriate voltage and current levels. For hydraulic cylinders, proportional or servo valves are used to modulate the fluid flow based on the control signals. To communicate between the actuators and the handheld force control system, a data transmission medium can be employed. This can be wired communication, such as using Ethernet, Universal Serial Bus (USB), or Controller Area Network (CAN), for example. The data transmission medium can optionally be wireless, such as using technologies such as Bluetooth, Wi-Fi, or Zigbee which may offer greater flexibility and mobility than wired communications. A microcontroller or processor can be employed as the central processing unit for the say control system, managing the communication between the actuators and the handheld force control system as described further below.

Software employed in example embodiments described herein can include control algorithms, sensor data processing, and one or more user interfaces. The sway control system uses control algorithms to translate the force feedback from the haptic devices into appropriate control signals for the actuators. These algorithms can be based on techniques such as PID (proportional-Integral-Derivative) control, model predictive control, or adaptive control, depending upon the desired level of performance and complexity. The sensor data from the payload and the crane's trolley need to be processed in real-time to compute the sway error which is represented by the position and rotation changes of the 3D printed pole. The microcontroller or microprocessor use this information to adjust the control signals sent to the actuators, effectively counteracting the sway. A user interface is used for the operator to interact with the sway control system. This interface can be a graphical display or set of physical buttons and switches, enabling the operator to monitor the system status, adjust control parameters, and provide manual control inputs if needed.

A robust sensor system is employed to monitor payload position and orientation in real-time providing essential data for the haptic feedback control system. By integrating the mechanical design and the sensor system, the proposed haptics-based force balance control method aims to improve the safety and efficiency of tower crane operations, offering a more effective human-in-the-loop approach for heavy machine stability controls. The sensor system of an example embodiment can include Inertial Measurement Units (IMUs), load sensors, encoders, and LiDAR (Light Distancing and Ranging) or vision-based sensors. IMUs can be placed in the payload and the crane's trolley to capture their respective accelerations, velocities, and orientations. This data can be used to compute the relative motion between the payload and the trolley, which is essential for adjusting the counterbalancing forces applied by the haptic devices. Load sensors can be installed at connections between the payload, cables, and actuators to measure the forces acting on the payload. These measurements help the control system determine the appropriate counterbalance forces needed to suppress sway. Rotary encoders can be used to monitor position and rotation of the haptic devices, the trolley, and the crane's hoist mechanism. This information is important for maintaining accurate force control and ensuring that the payload remains stable throughout the operation of the crane. LiDAR or vision-based sensors can be used to obtain the relative position and orientation of the payload relative to its surroundings, such as other structures or obstacles in the workspace. This information can be valuable for ensuring safe and efficient crane operation.

FIG. 7 is a schematic diagram of an example of a controller 120 that may be used to control a crane remotely as described herein. The controller 120 may include or otherwise be in communication with a processor 122, a memory 124, a communication interface 126 and a user interface 128. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element. The controller of FIG. 7 illustrates a controller for the haptic feedback system, controlling the haptic feedback device 130. However, a controller employing similar components can be employed for controlling the say control features of the crane, such as the drivers described above, responsive to the haptic feedback control input. The controllers may communicate with one another, such as through the communications module 126.

In some embodiments, the processor 122 (and/or co-processors or any other processing circuitry assisting or otherwise associated with the processor) may be in communication with the memory 124 via a bus for passing information among components of the apparatus. The memory 124 may include, for example, one or more volatile and/or non-volatile memories. In other words, for example, the memory 124 may be an electronic storage device (e.g., a computer readable storage medium) comprising gates configured to store data (e.g., bits) that may be retrievable by a machine (e.g., a computing device like the processor). The memory 124 may be configured to store information, data, content, applications, instructions, or the like for enabling the haptic feedback device 130 to carry out various functions in accordance with an example embodiment of the present disclosure. For example, the memory 124 could be configured to buffer input data for processing by the processor 122. Additionally or alternatively, the memory device could be configured to store instructions for execution by the processor, such as for controlling the crane 14 described above.

The processor 122 may be embodied in a number of different ways. For example, the processor 122 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 122 may include one or more processors configured in tandem via the bus to enable independent execution of instructions, pipelining and/or multithreading. The processor may be embodied as a microcontroller having custom bootloader protection for the firmware from malicious modification in addition to allowing for potential firmware updates.

In an example embodiment, the processor 122 may be configured to execute instructions stored in the memory 124 or otherwise accessible to the processor 122. Alternatively or additionally, the processor 122 may be configured to execute hard coded functionality. As such, whether configured by hardware or software methods, or by a combination thereof, the processor 122 may represent an entity (e.g., physically embodied in circuitry) capable of performing operations according to an embodiment of the present disclosure while configured accordingly. Thus, for example, when the processor 122 is embodied as an ASIC, FPGA or the like, the processor 122 may be specifically configured hardware for conducting the operations described herein. Alternatively, as another example, when the processor 122 is embodied as an executor of software instructions, the instructions may specifically configure the processor 122 to perform the algorithms and/or operations described herein when the instructions are executed. However, in some cases, the processor 122 may be a processor of a specific device (e.g., a head-mounted display for augmented reality or virtual reality control of the crane) configured to employ an embodiment of the present disclosure by further configuration of the processor 122 by instructions for performing the algorithms and/or operations described herein. The processor 122 may include, among other things, a clock, an arithmetic logic unit (ALU) and logic gates configured to support operation of the processor 122. In one embodiment, the processor 122 may also include user interface circuitry configured to control at least some functions of one or more elements of the user interface 128.

The communication interface 126 may include various components, such as a device or circuitry embodied in either hardware or a combination of hardware and software that is configured to receive and/or transmit data for communicating instructions to a crane. In this regard, the communication interface 126 may include, for example, an antenna (or multiple antennas) and supporting hardware and/or software for enabling communications wirelessly. Additionally or alternatively, the communication interface 126 may include the circuitry for interacting with the antenna(s) to cause transmission of signals via the antenna(s) or to handle receipt of signals received via the antenna(s). For example, the communication interface 126 may be configured to communicate wirelessly such as via Wi-Fi (e.g., vehicular Wi-Fi standard 802.11p), Bluetooth, mobile communications standards (e.g., 3G, 4G, or 5G) or other wireless communications techniques. In some instances, the communication interface may alternatively or also support wired communication, which may communicate with a separate transmitting device (not shown). As such, for example, the communication interface may include a communication modem and/or other hardware/software for supporting communication via cable, digital subscriber line (DSL), universal serial bus (USB) or other mechanisms. For example, the communication interface 126 may be configured to communicate via wired communication with other components of a computing device.

The user interface 128 may be in communication with the processor 122, such as the user interface circuitry, to receive an indication of a user input and/or to provide an audible, visual, mechanical, or other output to an operator. As such, the user interface 128 may include, for example, one or more buttons, light-emitting diodes (LEDs), a display, a head mounted display (virtual reality headset and augmented reality headset), a joystick, a speaker, and/or other input/output mechanisms. The user interface 128 may also be in communication with the memory 124 and/or the communication interface 126, such as via a bus. The user interface 128 may include an interface with the crane to provide operator instructions to the crane while receiving feedback from the crane and the payload thereof.

The communication interface 126 may facilitate communication between the crane 14, the user interface 128, and the haptic feedback device 130. The communication interface 126 may be capable of operating in accordance with various wired and wireless communication protocols. The controller may optionally include or be in communication with the haptic feedback device 130. The haptic feedback device may include various sensors or devices configured to provide haptic sensation to an operator of the crane. The haptic feedback device 130 can provide force feedback to an operator through hand controls to convey the imbalance of a payload of the crane such that the operator can steady the payload through anti-sway actions and controls.

Traditional methods for anti-sway controls rely heavily on training and experience of the human operator. Operating tactics such as "wait and see", minimum safe seed, and "reverse plugging" (i.e., reverse the gear before reaching the target) are used by experienced operators. Automatic anti-sway suppression methods typically only address single pendulum cranes, such as overhead cranes. Tower cranes, in contrast, present a more complex configuration that can only be modeled as a double pendulum problem. The additional locomotion functions of tower cranes, such as trolly movement and the rotation of the crane platform add further nonlinearities to the model that cannot be addressed by standard techniques for optimal control solutions. The use of automatic controls breaks the natural loop of human sensorimotor process that is critical for coordinating complex motor actions. Embodiments described herein exploit the haptic motor process for human operators to use as corrective motor actions. The haptics-based force balance simulator provided herein for human-centric anti-sway controls in crane operations is novel and distinct over prior teachings and provides significant technical advantages in comparison with prior techniques. Embodiments reproduce the position and forces of the payload directly rather than those of the crane components such that feedback to the human operator is more accurate and straightforward for intuitive reactions. The physics engine used by embodiments described herein can simulate soft body objects and nonlinear physical interactions.

According to embodiments described herein, the deformation of the tendon connecting the trolly and hook can be accurately reproduced, including the internal tension parameters. The nonlinear interactions between the trolly and the tendon and between the hook and the payload can be modeled with the physics engine. These modeling abilities enable the capture of the kinematic states of the payload connected to the tendon. Because of the ability to directly capture the states of the payload, embodiments described herein add an additional DOF to capture the balance of mass center of the payload via the haptic devices. The two haptic device 72 connected via structural member 74 form a seesaw type of haptic simulation. This additional dimension enables the human operator to correct the balance of the payload, particularly when the payload is relatively large and subject to loss of balance.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A haptic feedback system for crane operation comprising:
   a controller;
   a first haptic device comprising a first haptic device tip;
   a second haptic device comprising a second haptic device tip; and
   a structural member connecting the first haptic device and the second haptic device;
   wherein the controller is configured to correlate the first haptic device tip to a first reference point on a payload and to correlate the second haptic device tip to a second reference point on the payload, and wherein anti-sway control of the payload is effected by movement of the structural member by an operator.

2. The system according to claim 1, wherein force feedback through the first haptic device and the second haptic device is generated based on movement of the payload.

3. The system according to claim 1, wherein force feedback through the first haptic device at the first haptic device tip is generated based on movement of the first reference point on the payload, and wherein force feedback through the second haptic device at the second haptic device tip is generated based on movement of the second reference point on the payload.

4. The system according to claim 1, wherein the first reference point on the payload and the second reference point on the payload are determined based on one or more of a size of the payload, a shape of the payload, or a weight distribution of the payload.

5. The system according to claim 4, wherein the first reference point on the payload and the second reference point on the payload are determined from a database of payload profiles, wherein the payload is correlated to a reference payload of a payload profile.

6. The system according to claim 1, wherein movement of the structural member by the operator causes movement of the payload by the crane corresponding to the movement of the structural member.

7. The system according to claim 6, wherein movement of the payload by the crane comprises movement of one or more of a trolley of the crane, a jib of the crane, or a pulley system of the crane.

8. A method for haptic feedback for crane operation comprising:
receiving an indication of a first reference point of a payload;
receiving an indication of a second reference point of the payload;
causing movement of the payload at the first reference point based on input from a first haptic device;
causing movement of the payload at the second reference point based on input from a second haptic device;
providing haptic feedback to the first haptic device based on movement of the payload at the first reference point; and
providing haptic feedback to the second haptic device based on movement of the payload at the second reference point.

9. The method according to claim 8, wherein the first haptic device is connected to the second haptic device by a structural member.

10. The method according to claim 8, wherein haptic feedback provided to the first haptic device based on movement of the payload at the first reference point comprises movement of a first tip of the first haptic device based on movement of the payload at the first reference point and wherein haptic feedback provided to the second haptic device based on movement of the payload at the second reference point comprises movement of a second tip of the second haptic device based on movement of the payload at the second reference point.

11. The method according to claim 8, wherein the indication of the first reference point of the payload is based on user input identifying the first reference point on the payload, and wherein the indication of the second reference point of the payload is based on user input identifying the second reference point on the payload.

12. The method according to claim 8, wherein the indication of the first reference point of the payload is based on a first stored reference point of a reference payload in a database of payload profiles, wherein the indication of the second reference point of the payload is based on a second stored reference point of the reference payload in the database of payload profiles.

13. The method according to claim 12, further comprising selecting the reference payload based on at least a predefined similarity to the payload.

14. The method of claim 13, wherein the predefined similarity includes one or more of a payload size, a payload shape, or a payload weight distribution.

15. A controller for haptic feedback for crane operation, the controller configured to:
receive an indication of a first reference point of a payload;
receive an indication of a second reference point of the payload;
cause movement of the payload at the first reference point based on input from a first haptic device;
cause movement of the payload at the second reference point based on input from a second haptic device;
provide haptic feedback to the first haptic device based on movement of the payload at the first reference point; and
provide haptic feedback to the second haptic device based on movement of the payload at the second reference point.

16. The controller according to claim 15, wherein haptic feedback provided to the first haptic device based on movement of the payload at the first reference point comprises movement of a first tip of the first haptic device based on movement of the payload at the first reference point and wherein haptic feedback provided to the second haptic device based on movement of the payload at the second reference point comprises movement of a second tip of the second haptic device based on movement of the payload at the second reference point.

17. The controller according to claim 15, wherein the indication of the first reference point of the payload is based on user input identifying the first reference point on the payload, and wherein the indication of the second reference point of the payload is based on user input identifying the second reference point on the payload.

18. The controller according to claim 17, wherein the indication of the first reference point of the payload is based on a first stored reference point of a reference payload in a database of payload profiles, wherein the indication of the second reference point of the payload is based on a second stored reference point of the reference payload in the database of payload profiles.

19. The controller according to claim 18, wherein the controller is further configured to select the reference payload based on at least a predefined similarity to the payload.

20. The controller of claim 19, wherein the predefined similarity includes one or more of a payload size, a payload shape, and a payload weight distribution.

\* \* \* \* \*